United States Patent [19]

Davies et al.

[11] Patent Number: 4,924,631
[45] Date of Patent: May 15, 1990

[54] PULTRUDED WINDOW FRAME WITH RIGID CORNER INSERT

[75] Inventors: Lawrence W. Davies, Winnipeg; Kenneth S. Church, Gimli, both of Canada

[73] Assignee: Omniglass Ltd., Winnipeg, Canada

[21] Appl. No.: 267,853

[22] Filed: Nov. 7, 1988

[51] Int. Cl.⁵ .................................... E06B 1/04
[52] U.S. Cl. .......................... 49/504; 52/656; 49/DIG. 2
[58] Field of Search ............ 49/501, 504, DIG. 2; 52/656

[56] References Cited

FOREIGN PATENT DOCUMENTS 0116214  2/1969  Norway ................. 49/DIG. 2

Primary Examiner—Kenneth J. Dorner
Assistant Examiner—Gerald A. Anderson
Attorney, Agent, or Firm—Adrian D. Battison; Stanley G. Ade; Murray E. Thrift

[57] ABSTRACT

Window frames formed from pultruded glass fibre reinforced resin material are shaped so that a movable portion of the frame includes a hollow profile, an opening in which is closed by a separate strip interlocking with the profile and carrying a weatherstripping blade. A corner member is defined by a pair of plate-like legs interconnected at right angles, each of which slides into a slot in the profile defined by shoulders on the side walls and a recess on the outer wall. The corner member is then screwed to the part through the recess on the outer wall.

13 Claims, 3 Drawing Sheets

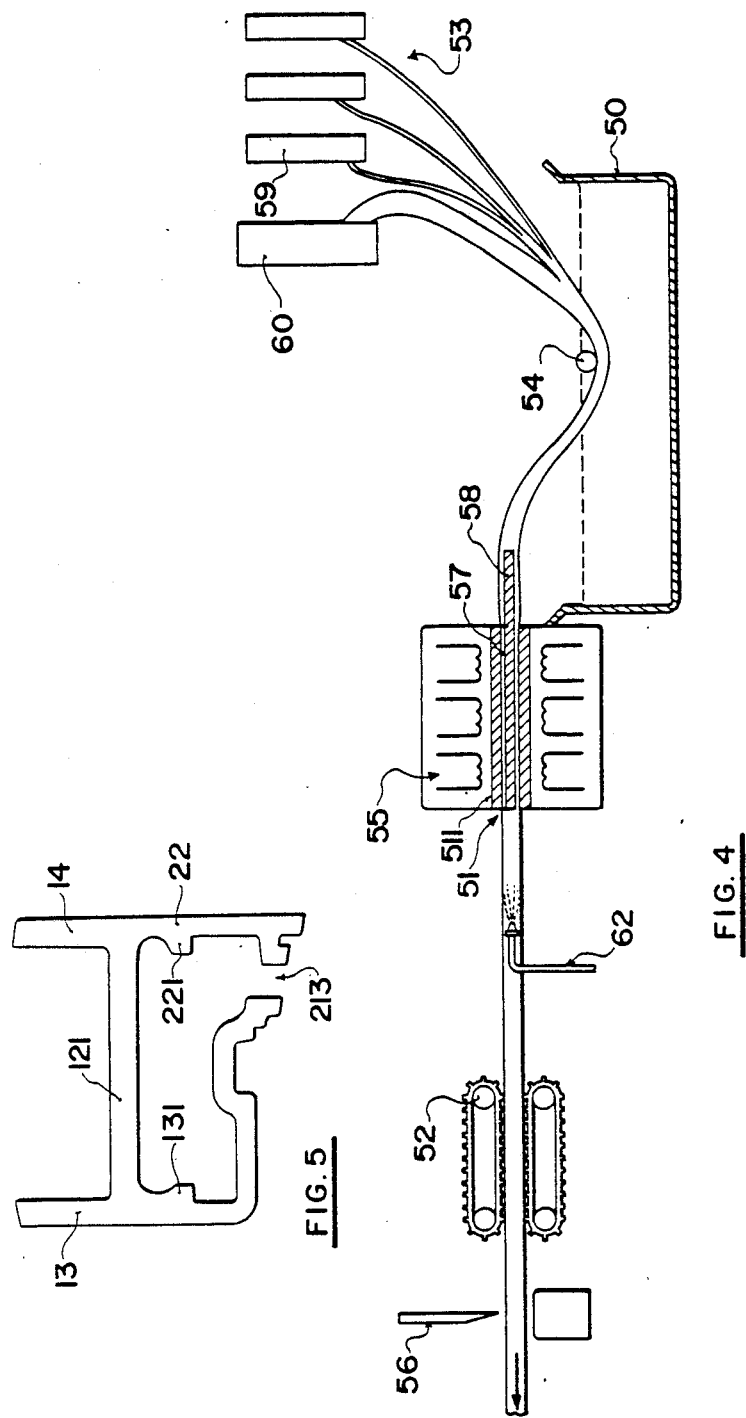

PULTRUDED WINDOW FRAME WITH RIGID CORNER INSERT

This application is a continuation of application Ser. No. 031,474 filed Mar. 26, 1987 which is a continuation of application Ser. No. 688,329 filed Jan. 2, 1985 both of which are now abandoned.

BACKGROUND OF THE INVENTION

This invention relates to window frames and particularly to window frames manufactured from a plurality of frame parts, each of which is cut from a pultruded profile of a glass fibre reinforced resin material.

In recent years there have been many different materials used to replace the original conventional wooden window frames. These materials need to be sufficiently rigid to support the window pane, resistant to corrosion or other deterioration from exposure to the various aspects of the weather, capable of supporting weatherstripping and firmly engaging an adjacent surface to provide seals against the transmission of air and preferably of a low thermal conductivity in order to avoid the transmission of heat from the inside of a building to the outside of a building. Various materials have been used particularly aluminum and vinyl.

It is also important that the material can be formed in an extrusion-type process so that long lengths of a constant cross section can be formed for cutting into desired lengths for assembly into a generally rectangular window frame.

The materials presently on the market have various disadvantages which are well known in the trade and need not be discussed at length here. At various times in past years attempts have been made or consideration has been given to manufacture of window frames of this type from glass fibre reinforced resin material. However, these attempts and considerations have met with serious problems which have prevented the product being commercially marketed.

One problem which has arisen with pultrusions is that of manufacturing a suitable corner for coupling the frame parts together at the corners to form generally a rectangular window frame. Techniques previously used for aluminum, vinyl and wood are unsatisfactory in view of the different structure and strength characteristics necessary for forming the window frame profile by pultrusion.

SUMMARY OF THE INVENTION

It is one object of the present invention, therefore, to provide a window frame having corner insert members which allow the coupling of the frame parts at the corners in a manner which supports and stabilizes the pultruded part.

According to the invention, therefore, there is provided a window frame comprising a plurality of frame parts joined at corners of the frame, each part being cut from a pultruded profile of a glass fibre reinforced resin material and a plurality of corner members each interconnecting a respective pair of the parts at a corner, each corner member being rigid and having two legs at an angle for projecting into respective ones of the pair of parts, the profile defining a hollow box section having an inner wall, an outer wall and two side walls, each side wall having an inwardly projecting shoulder and the outer wall having at least one wall portion which is recessed relative to an outer surface of the outer wall so that an inner surface of the wall portion cooperates with the shoulder to define a slot for slidingly receiving a leg of the corner member and a screw passing through said wall portion into said leg for clamping said corner member to said part.

The corner member preferably has legs in the form of flat plates arranged mutually at right angles so that each plate inserts into the slot which is therefore long and narrow in the respective part. This has the advantage that the plate acts to support the ends of the pultruded profile against flexing inwardly and outwardly transverse to the length of the pultrusion since pultrusions are relatively weak in this direction.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE FIGURES

FIG. 4 is a schematic illustration of a pultrusion technique for forming the profiles of FIGS. 1 and 2.

FIG. 5 a cross sectional view of a modified sash portion.

In the drawings like characters of reference indicate corresponding parts in the different figures.

DETAILED DESCRIPTION

It will be appreciated that the window frames, both fixed and sash, are formed from four pieces arranged at right angles and joined at mitered corners.

Figure 1:
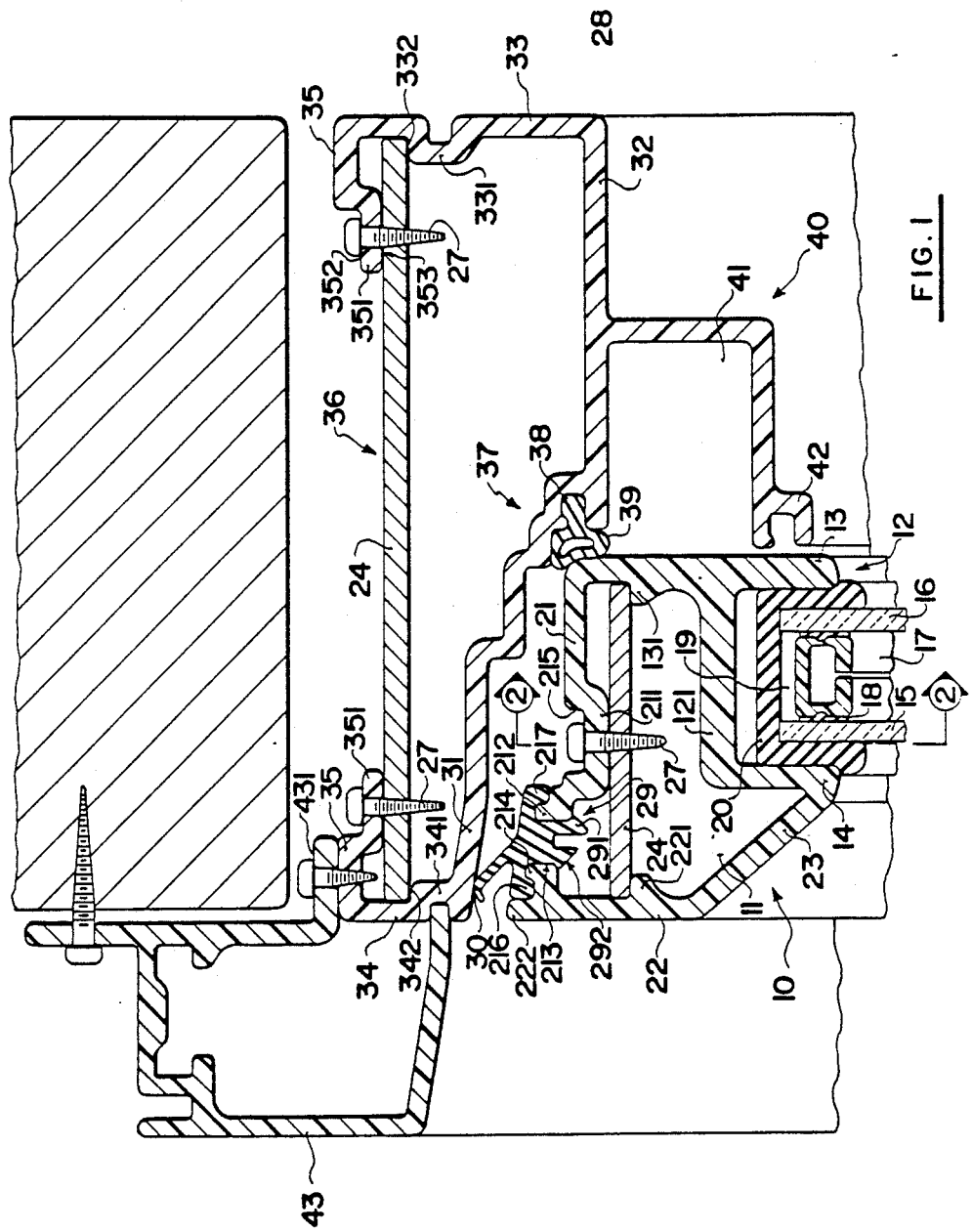
FIG. 1 is a cross sectional view through a window frame including a fixed window frame part and a movable or sash part.

Turning firstly to the movable or sash part of the window frame which can form a casement or awning window depending upon requirements and the hardware chosen (not shown as this is conventional), the profile is generally indicated at 10 in FIG. 1 and effectively has a hollow interior 11. The profile is formed by a pultrusion technique from a glass fibre reinforced resin material. The profile provides a channel 12 having upstanding side walls 13 and 14 and a base 121 for receiving a sealed window unit of conventional construction.

The sealed window unit comprises a pair of panes of glass 15, 16 which are separated by a spacer 17. The spacer 17 is attached to the panes of glass by a pair of beads 18 of a sealant material, by a filling sealant material 19 and by a tape 20 which extends around from the outer surface of one pane to the outer surface of the other pane covering the filler 19.

The wall 13 extends downwardly to the bottom of the profile where a lower wall 21 extends across the bottom of the profile to a front wall 22 which joins the bottom to the upper edge of the channel wall 14. In the embodiment shown the wall 13 forms the inner surface of the window frame for facing inwardly into the building and the wall 22 forms the outer surface with an inclined edge 23 which acts to throw off water from the wall 22.

The wall 13 downwardly of the channel 12 includes an inwardly projecting shoulder 131 which is arranged symmetrically to an inwardly projecting shoulder 221 of the wall 22. The bottom wall 21 also includes an upwardly extending ridge portion 211 having sides 215 which is positioned approximately midway through the profile and which defines a shoulder or surface on the inner surface and a recess on the outer surface of the wall 21. The vertical spacing between the bottom of the shoulders 131 and 221 and the top of the shoulder 211 defines a slot which is arranged to be substantially equal to the width of a leg of a corner member 25 more of which is visible in FIG. 2. In FIG. 1 only one leg is visible in cross section and it will be noted that the corner member 25 comprises merely an angle piece formed from two flat plates or legs of rigid material and indicated at 24, 26 respectively which are arranged at right angles and which join at a single line lying in the plane of both of the legs 24, 26.

The corner member 25 is preferably formed from aluminum or other material which is sufficiently rigid to provide a press fit between the shoulders 131, 221, 211 and prevent twisting at the corner formed between the two profiles. The shoulder 211 is connected to the leg 24 by a screw 27 so that as shown in more detail in FIG. 2, the two profiles are connected together at a miter joint by insertion as a press fit of the corner member 25 and then the attachment of the corner member to the profiles by the screws 27. The screws 27 can be preferably self-tapping screws which pass through drilled holes in the shoulder 211 and in the legs 24, 26 and form screw threads in the drilled holes for rigid attachment to the legs 24, 26. The recess formed in the bottom surface of the lower wall 21 by the shoulder 211 is sufficient to receive the head of the screw 27 so that it is rebated into the underside of the profile and does not interfere with the proper closing of the profile against an outer window frame indicated at 28.

Figure 2:
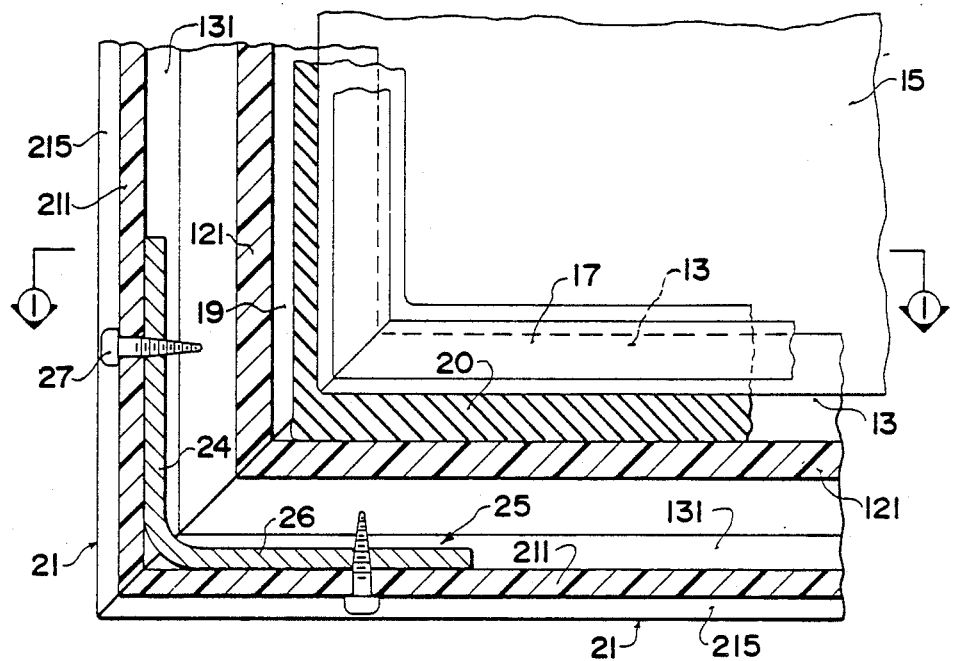
FIG. 2 is a cross sectional view along the line 2—2 of FIG. 1 showing the corner between the two profiles of the movable part.

The embodiment shown in FIGS. 1 and 2 provides a window frame which is of the hinge-type so that the frame provided by the profiles 10 can pivot about an axis which lies vertically upwardly in relation to FIG. 1.

The profile 10 as shown in FIG. 1 is fully closed around the hollow interior 11. However, in order to form the closed profile it is manufactured from a substantially closed part which is formed by the pultrusion technique from glass fibre reinforced resin material together with a an extruded plastics strip 29 which fully closes the part. Thus, it will be noted that the lower wall 21 terminates at a downwardly turned flange 212 on one side of an opening 213 and in a second downwardly turned flange 214 on the other side of the opening. The wall 22 terminates in a downwardly extending lowermost lip 222 which is parallel to the flange 214 and forms a narrow recess 216 therebetween. A second recess 217 effectively symmetrical to the recess 215 relative to the opening 213 is arranged adjacent the flange 212.

The plastics strip 29 provides an interlocking shape relative to the flanges 212, 214, 222 and recesses 215, 216 and also extends up through the lower wall 21 to provide upper outwardly extending shoulders 291, 292 which lock the strip 29 in position in the lower wall 21. The strip 29, therefore, can be inserted into the pultruded profile by sliding in from one end of the opening 217 so that it is then locked in position to completely close the profile. It can, however, be removed for replacement when necessary. The space 213 in the lower wall 21 is relatively small so that the profile is substantially fully closed but with the slot 213 extending fully along the profile and, as explained hereinafter, this provides a space for receiving a support for the mandrel of the die which forms the inner surface of the profile 10. The space 213, therefore, can be merely sufficient in width to receive the support for the mandrel or can be designed to be slightly wider in order to receive a plastics strip 29 which is of sufficient width to provide the necessary strength.

The underside of the plastics strip 29 can, in one embodiment (not shown) have a slot along the length thereof for receiving a conventional weather stripping portion. Alternatively, as shown, the strip and a flexible blade 30 forming a weather stripping can form a single piece of flexible extrusion formed by plastics extrusion with the strip 29 being sufficiently rigid to remain interlocked in place while supporting the profile and the blade 30 being sufficiently flexible to bend upwardly and downwardly to accommodate closing of the window.

In addition, it will be noted that the undersurface of the plastics strip 29 extends rearwardly and slightly upwardly from the flange 222 to enable a suitable seal to be formed between the undersurface of the strip 29, the weather stripping 30 and the upper surface of the outer window frame 28. It is particularly effective to provide the closing plastics strip 29 at the position of the weather stripping 30 since this is generally not visible in the finished structure and because it provides a very effective anchoring mechanism for the weather strip 30.

Turning now to FIG. 5, there is shown in cross section the profile of a modified sash portion which can replace the frame 10 of FIG. 1. In this embodiment, the strip 29 is omitted thus showing the profile of a frame part as cut from a pultrusion.

This profile is designed for a triple pane sealed window unit and therefore the rear wall 13 and the front wall 14 defining the sides of the profile are arranged at the rear and front respectively thus omitting the inclined wall 23 of FIG. 1. Thus, the front wall or upstanding side wall 14 is contiguous with the side wall 22 of the lower part of the profile which acts to support the channel defined by the walls 13 and 14 for the window unit.

The remaining details of the lower portion remain as previously described in relation to FIG. 1.

Returning now to FIG. 1, the movable or sash part of the window frame 10 is shown in cooperation with a fixed part of the window frame 28 which attaches to the building in a conventional manner. Thus, the frame 28 includes an inclined sill portion 31 which cooperates with the inclined undersurface of the frame 10 and particularly the weather strip 30. The sill 31 forms an upper surface of a box section defining the frame which includes a further upper surface portion 32, side walls 33 and 34 and a lower wall 35 which is formed in two parts with an open central section 36. The upper wall or sill joins to the upper wall portion 32 by a number of steps generally indicated at 37 culminating in a recess 38 for receiving a compressible weather stripping 39 of conventional type.

An upstanding channel section 40 is connected to an upper surface of the upper wall portion 32 so as to cooperate therewith in defining a channel 41 for receiving actuating mechanism (not shown) for movement of the sash portion 10 relative to the fixed portion 28 of the frame. A further recess 42 symmetrical to the recess 38 is arranged on the upper side of the channel 41 for receipt of a further weather strip, if required.

The side walls 33 and 34 of the box section each include a recess 331, 341 which projects inwardly to the box section thus defining a shoulder 332, 342 on the underside of the recess lying at right angles to the wall. The recess defines a rectangular channel on the outer surface of the wall 33 for receipt of a molding with a suitable molding being indicated at 43 providing a brick mold for cooperating with the outer surface of the building. The brick mold includes a flange 431 which is screwed to the underside of the wall 35 at the outer edge thereof adjacent the wall 34.

The lower wall 35 includes a pair of recessed portions 351 which define a recess surface 352 on the outer surface of the lower wall 35 and a projecting shoulder or surface 353 on the inner surface. The shoulders 332 and 342 are arranged to cooperate with the surfaces 353 to define a slot for receiving a leg 24 of the angle member 25 substantially as previously described in relation to the frame 10. In this case, each of the recessed portions 351 is screwed to the leg by screws 27 as shown.

Figure 3:
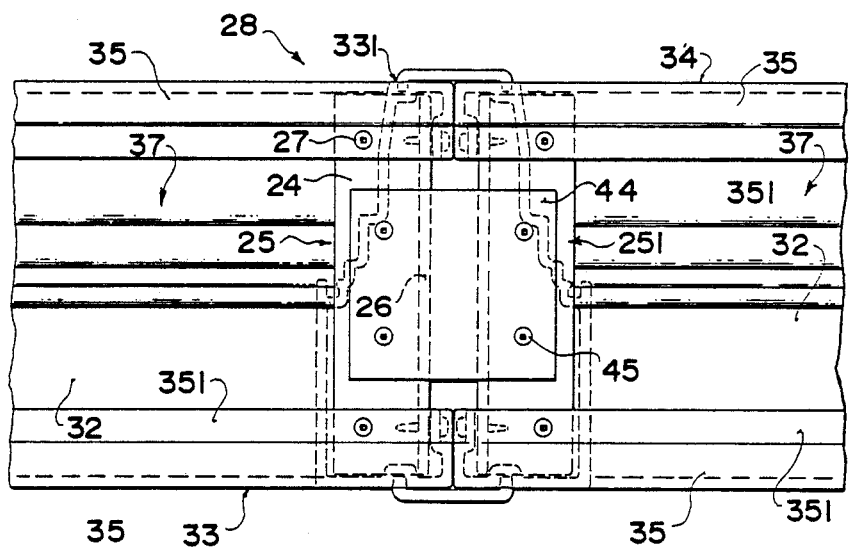
FIG. 3 is a plan view of a corner of the fixed part with that fixed part abutted to and connected to a symmetrical fixed part.

Turning now to FIG. 3, there is shown a portion of one corner of the frame 28 showing the undersurface of the lower wall 35 of one frame part, the corner member 25 with legs 24 and 26 and the screws 27. In addition, a similar corner of a second frame is shown abutting the corner. In order to couple the two frames together, a plate 44 is placed across the two corner members 25, 251 and is screwed thereto by screws 45. A mullion strip 46 finishes the front face.

Turning now to the pultrusion method schematically indicated in FIG. 4 for forming the profile of FIGS. 1 and 2, the pultrusion technique comprises a supply of glass fibre reinforcements in the form of roving bobbins 48 and a roll of matting 50. The supply is generally indicated at 53. The glass fibre reinforcements are drawn into a bath 60 containing the resin material comprising a number of solid and liquid ingredients and are fully wetted in the bath by passing under a bar 54. The resin and glass fibre reinforcements then enter a die 51 which is heated by a surrounding heating jacket using electrical heating and indicated at 55. The die 51 includes an outer shaping die portion 511 and a mandrel 58 which is supported relative to the outer portion 511 by a mandrel support member or web 57. The mandrel 58 is shaped to define the inner surface of the pultrusion and extends beyond the end of the outer portion 511 toward the die bath in order that the fibres can be shaped around the mandrel before they enter the die where they are squeezed and the resin cured by the application of heat thus forming a shaped cured part which is drawn out of the die by a pulling mechanism schematically indicated at 52. The web 57 acts to shape the opening in the profile either indicated at 36 in profile 28 or at 213 in profile 10. A cutting device 56 downstream of the pulling mechanism 52 can be used to cut the part into lengths suitable for shipping. The heat of the die is arranged so that the part is effectively fully cured as it leaves the die and before encountering a spray nozzle 52 for a urethane or other suitable coating.

In order to allow the pultruded parts to receive screws 27, it is very much preferred that the pultrusion resin include 10% to 50% by volume of glass or ceramic hollow micro spheres of 2 to 50 microns in diameter. This material, when fully mixed in the resin, provides a considerable portion of air within the resin which, in the finished part, acts as an insulation material preventing or inhibiting the conduction of heat through the profile and in addition allows crushing or compression of the part without splitting of the part due to the insertion of the screw.

Further details of the pultrusion techniques including the resin, arrangement of fibre content and coating the material will be known to one skilled in the art and accordingly will not be described in detail herein.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A window comprising a window frame having a plurality of frame parts each of said frame parts comprising an elongate substantially rigid structural member having a wall shaped to define a window pane receiving portion and at least partly enclosing a hollow interior of the frame part, each end of each of said plurality of frame parts being connected to an end of a respective one of the other frame parts to define said window frame with said receiving portions thereof cooperating to define a window pane receiving section, structural strength for each of said frame parts being provided solely by at least a portion thereof formed wholly of a thermosetting resin material reinforced by continuously longitudinally extending glass fiber reinforcing structures, said part having aperture means defining a recess in an outer surface of said wall extending longitudinally thereof for receiving a weather-stripping material extending outwardly from said recess, said window frame having a coating on an outer surface of the wall of the parts thereof, a window pane mounted in said window pane receiving section, said window pane comprising a sealed multiple glass sheet unit and a plurality of mechanical fastening members each being arranged to connect the end of one frame part to the end of a next adjacent frame part, each mechanical fastening member being rigid and including two legs at an angle each leg for projecting into a respective end of a one of the frame parts, the wall of each frame part defining a hollow box section having an inner wall part, an outer wall part and two side wall parts, each side wall part having an inwardly projecting shoulder and the outer wall part having at least one wall portion which is recessed relative to an outer surface of the outer wall part so that an inner surface of the wall portion cooperates with the shoulder to define a slot for slidingly receiving the respective leg of the member and a screw passing through said wall portion into said leg for clamping said member to said part.

2. The invention according to claim 1 wherein said aperture means in cross section has a wider area at a base thereof than at a mouth thereof for retaining said weather-stripping material in location therein.

3. The invention according to claim 2 wherein said aperture means comprises a slot arranged such that a portion of the wall of the frame part on one side of the slot extends outwardly from a remaining portion thereof and is connected to said remaining portion solely at one end thereof.

4. The invention according to claim 1 wherein the thermosetting material contains 10% to 50% by volume of hollow microspheres.

5. The invention according to claim 1 wherein said glass fiber reinforcing structure include a proportion of a mat material and a proportion of a roving material.

6. A window frame according to claim 1 wherein each leg of each mechanical fastening member comprises a flat plate having a width substantially equal to the space between the side walls so that the slot is narrow and elongate for receiving said plate.

7. A window frame comprising a plurality of frame parts each of said frame parts comprising an elongate substantially rigid structural member having a wall shaped to define a hollow box section having an outer wall part, an inner wall part and two side wall parts at least partly enclosing a hollow interior of the part, each end of each of said plurality of frame parts being connected to an end of a respective one of the other frame parts to define said window frame, structural strength for each of said parts being provided solely by at least a portion thereof formed wholly of a thermosetting resin material reinforced by continuously longitudinally extending glass fiber material, said part having aperture means defining a recess in an outer surface of said wall extending longitudinally thereof for receiving a weather-stripping material extending outwardly from said recess, each of said frame parts having a coating on an outer surface of the wall thereof, and a plurality of mechanical fastening members each being arranged to connect the end of one frame part to the end of a next adjacent frame part, the member including a flat leg portion thereof extending into the hollow interior of the frame part and rigidly connected to the frame part, each side wall part having an inwardly projecting shoulder, the outer wall part having a central open portion and two wall portions each of which is recessed relative to an outer surface of the outer wall part so that an inner surface of each of the wall portions cooperates with the shoulder to define a slot for slidingly receiving the respective flat leg portion of the member and a pair of screws each passing through a respective one of said wall portions into said flat leg portion for clamping said member to said part.

8. A window comprising an outer window frame and a sash window pivotally mounted on the outer window frame, the sash window comprising a plurality of frame parts each of said frame parts comprising an elongate substantially rigid structural member having a wall shaped to define a window pane receiving portion and enclosing a hollow interior of the frame part, each end of each of said plurality of frame parts being connected to an end of a respective one of the other frame parts to define said window frame with said receiving portions thereof cooperating to define a window pane receiving section, structural strength for each of said frame aprts being provided solely by at least a portion thereof formed wholly of a thermosetting resin material reinforced by continuously longitudinally extending glass fiber material, said frame part having aperture means defining a recess in an outer surface of said wall extending longitudinally thereof for receiving a weather-stripping material extending outwardly from said recess, said window frame having a coating on an outer surface of the wall of the parts thereof, a window pane mounted in said receiving section, said window pane comprising a sealed multiple glass sheet unit and a plurality of mechanical fastening members each being arranged to connect the end of one frame part to the end of a next adjacent frame part, the mechanical fastening member including a portion thereof extending into the hollow interior of the frame part and rigidly connected to the frame part, the outer window frame comprising a plurality of frame parts each of sid frame parts comprising an elongate substantially rigid structural member having a wall shaped to define a hollow box section having an outer wall part, an inner wall part and two wide wall parts at least partly enclosing a hollow interior of the part, each end of each of said plurality of frame parts being connected to an end of a respective one of the other frame parts to define said window frame, structural strength for each of said frame parts being provided soleldy by at least a portion thereof formed wholly of a thermosetting resin material reinforced by continuously longitudinally extending glass fiber material, said frame part having aperture means defining a recess in an outer surface of said wall extending longitudinally thereof for receiving a weather-stripping material extending outwardly from said recess, each of said frame parts having a coating on an outer surface of the wall thereof, and a plurality of mechanical fastening members each being arranged to ocnnect the end of one frame part to the end of a next adjacent frame part, the member including a flat leg portion thereof extending into the hollow interior of the frame part and rigidly connected to the frame part, each side wall part having an inwardly projecting shoulder, the outer wall part having a central open portion and two wall portions each of which is recessed relative to an outer surface of the outer wall part so that an inner surface of each of the wall portions cooperates with the shoulder to define a slot for slidingly receiving the respective flat leg portion of the member and a pair of screws each passing through a respective one of said wall portions into said flat leg portion for clamping said member to said frame part.

9. A window comprising a window frame having a plurality of frame parts each of said frame parts comprising an elongate substantially rigid structural member having a wall shaped to define a window pane receiving portion and at least partly enclosing a hollow interior of the frame part, each end of each of said plurality of frame parts being connected to an end of a respective one of the other frame parts to define said window frame with said receiving portions thereof cooperating to define a window pane receiving section, structural strength for each of said frame parts being provided solely by at least a portion thereof formed wholly of a thermosetting resin material reinforced by continuously longitudinally extending glass fiber reinforcing structures, said part having aperture means defining a recess in an outer surface of said wall extending longitudinally thereof for receiving a weather-stripping material extending outwardly from said recess, said window frame having a coating on an outer surface of the wall of the parts thereof, a window pane mounted in said window pane receiving section, said window pane comprising a sealed multiple glass sheet unit and a plurality of mechanical fastening members each being arranged to connect the end of one frame part to the end of a next adjacent frame part, each mechanical fastening member being rigid and including two legs at an angle each leg for projecting into a respective end of a one of the frame parts, the wall of each frame part defining a hollow box section having an inner wall part, an outer wall part and two side wall parts, the outer wall part having at least one wall portion which defines a recess relative to an outer surface of the outer wall part, a screw passing through the wall portion into the leg with a head of the screw received wholly within the recess and the wall portion engaging the leg, and means on at least one of the inner wall part and the two side wall parts for cooperating with said outer wall portion for engaging and confining said leg.

10. The invention according to claim 9 wherein said aperture means in cross section has a wider area at a base thereof than at a mouth thereof for retaining said weather-stripping material in location therein.

11. The invention according to claim 9 wherein said aperture means comprises a slot arranged such that a portion of the wall of the frame part on one side of the slot extends outwardly from a remaining portion thereof and is connected to said remaining portion solely at one end thereof.

12. The invention according to claim 9 wherein the thermosetting material contains 10% to 50% by volume of hollow microspheres.

13. The invention according to claim 9 wherein said glass fiber reinforcing structure include a proportion of a mat material and a proportion of a roving material.

* * * * *

UNITED STATES PATENT AND TRADEMARK OFFICE
CERTIFICATE OF CORRECTION

PATENT NO. : 4,924,631
DATED : May 15, 1990
INVENTOR(S) : Lawrence W. Davies, Kenneth S. Church It is certified that error appears in the above-identified patent and that said Letters Patent is hereby corrected as shown below:

Title Page:
[22] Filed November 7, 1988 add --related U.S. Application Data--

[63] Continuation of Application Serial No. 031,474 filed March 26, 1987 which is a continuation of Application Serial No. 688,329 filed January 2, 1985 both of which are now abandoned.

[30] Foreign Patent Document

Jan 3|84 [GB] United Kingdom 8400032

Signed and Sealed this

Twenty-first Day of April, 1992

Attest:

HARRY F. MANBECK, JR.

Attesting Officer

Commissioner of Patents and Trademarks